(12) United States Patent
Lee

(10) Patent No.: US 8,104,564 B2
(45) Date of Patent: Jan. 31, 2012

(54) ANTITHEFT SYSTEM AND METHOD FOR CONSTRUCTION EQUIPMENT

(75) Inventor: Chun Han Lee, Gimhae-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 181 days.

(21) Appl. No.: 12/702,717

(22) Filed: Feb. 9, 2010

(65) Prior Publication Data

US 2010/0199730 A1    Aug. 12, 2010

(30) Foreign Application Priority Data

Feb. 10, 2009   (KR) .................. 10-2009-0010626

(51) Int. Cl.
*B60R 25/00*    (2006.01)

(52) U.S. Cl. .................................................. 180/287
(58) Field of Classification Search .............. 180/287, 180/271; 70/266
See application file for complete search history.

(56) References Cited

U.S. PATENT DOCUMENTS

| 4,596,303 | A | * | 6/1986 | Tremblay ................ 180/287 |
| 4,672,225 | A | * | 6/1987 | Hanisko et al. ........... 307/10.5 |
| 4,754,838 | A | * | 7/1988 | Cody ..................... 180/287 |
| 7,970,518 | B2 | * | 6/2011 | Bernardi et al. ............. 701/50 |

* cited by examiner

*Primary Examiner* — Faye M. Fleming
(74) *Attorney, Agent, or Firm* — Ladas & Parry LLP

(57) ABSTRACT

An antitheft system and method for construction equipment is disclosed. The antitheft system and method can prevent the construction equipment from driving if a driver gets out of a cabin in the state in which an ignition is turned on so as to preheat a heater or engine or in a case where a driving unit is not manipulated during a predetermined period.

2 Claims, 2 Drawing Sheets

ANTITHEFT SYSTEM AND METHOD FOR CONSTRUCTION EQUIPMENT

CROSS-REFERENCE TO RELATED APPLICATIONS

This application is based on and claims priority to Korean Patent Application No. 10-2009-10626, filed on Feb. 10, 2009, in the Korean Intellectual Property Office, the disclosure of which is incorporated herein in its entirety by reference.

FIELD OF THE DISCLOSURE

The present disclosure relates to an antitheft system and method for construction equipment in which the construction equipment can be driven by unlocking a lock device when a driver gets out of a cabin in a state in which an ignition is turned on. More particularly, the present disclosure relates to an antitheft system and method for construction equipment which can prevent the construction equipment from driving if a driver gets out of a cabin in the state in which an ignition is turned on so as to preheat a heater or engine or in a case where a driving unit is not manipulated during a predetermined period.

BACKGROUND OF THE DISCLOSURE

In general, common keys of the same kinds are used in construction equipment such as an excavator so as to effectively manage the equipment. Consequently, in the case where a door of the construction equipment is not closed or the common key is applied even though the door is closed, others can approach the construction equipment and then open the door to drive the construction equipment, which may cause a theft case or a safety accident case.

In order to prevent such a problem, construction equipment with a special device, such as a password input unit, for driving the construction equipment have been developed and used recently.

In the case where the special device is used, if an ignition is turned on for the purpose of preheating a heater or an engine, it cannot effectively protect the construction equipment from theft or safety accident since the engine is driving.

SUMMARY OF THE DISCLOSURE

Accordingly, the present disclosure has been made to solve the above-mentioned problems occurring in the prior art while advantages achieved by the prior art are maintained intact.

The present disclosure relates to an antitheft system and method for construction equipment which can prevent theft and safety accident of the construction equipment if a driver gets out of a cabin in the state in which an ignition is turned on so as to preheat a heater or engine.

In an embodiment of the present disclosure, there is provided an antitheft system and method for construction equipment including a hydraulic device for controlling flow of working fluid supplied to an actuator which drives a working device, which includes a first step of reading information on a function selection switch, a timer, a safety lever and engine operation; a second step of determining whether the function selection switch is turned on or off; a third step of determining whether the safety lever is switched to an OFF position; a fourth step of comparing an input time inputted in a timer with a preset time and if the input time of the timer is shorter than the preset time, proceeding to the second step; a fifth step of determining whether an ignition of the engine is turned on if the function selection switch is switched to an ON state by a driver, the safety lever is switched to the OFF position by the driver, and the input time of the timer is longer than a preset time; a sixth step of determining that the driver gets out of a cabin in the state in which the ignition of the engine is turned on, and locking the driving unit so that the driving unit does not operate if it is determined in the fifth step that the ignition is turned on; a seventh step of determining whether a security device is passed by the driver if the driving unit is switched to a lock position; and an eighth step of unlocking the driving unit if the user has passed the security device.

If it is determined in the fifth step that the ignition is turned on, the sixth step locks the hydraulic device, while if is determined in the fifth step that the ignition is turned off, the sixth step locks the driving unit to prevent the ignition from being turned on.

With the above description, in the case where the driver gets out of the cabin in the state in which the ignition is turned on so as to preheat a heater or engine, the hydraulic device is automatically locked, thereby preventing the theft thereof and also preventing a safety accident by malfunction of a beginner.

BRIEF DESCRIPTION OF THE DRAWINGS

The above and other objects, features and advantages of the present disclosure will be more apparent from the following detailed description taken in conjunction with the accompanying drawing, in which.

DETAILED DESCRIPTION OF EXEMPLARY EMBODIMENTS

Hereinafter, exemplary embodiments of the present disclosure will be described with reference to the accompanying drawings. The matters defined in the description, such as the detailed construction and elements, are nothing but specific details provided to assist those of ordinary skill in the art in a comprehensive understanding of the present disclosure, and thus the present disclosure is not limited thereto.

An antitheft system and method for construction equipment according to an embodiment of the present disclosure will now be described in detail with reference to the accompanying drawings.

Figure 1:
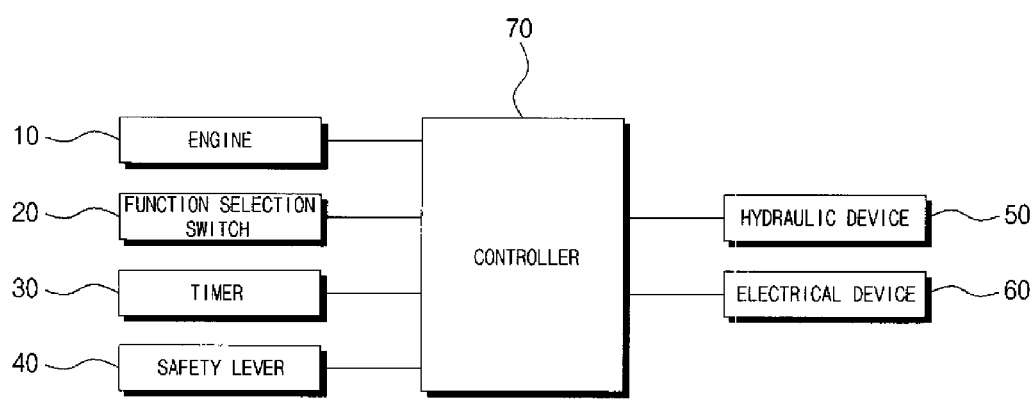
FIG. 1 is a schematic block diagram illustrating an antitheft system for construction equipment according to an embodiment of the present disclosure.

The antitheft system and method for construction equipment according to an embodiment of the present disclosure as shown in FIG. 1 includes an engine 10; a function selection switch 20 locking a hydraulic device or the like if a driver gets out of the equipment in a state in which the equipment starts operation; a timer 30, a safety lever 40 intercepting hydraulic fluid supplied to a control lever if the driver switches the safety lever 40 towards a floor of a cabin to leave a driver's seat; a hydraulic device 50 controlling the hydraulic fluid supplied to a hydraulic actuator; an electrical device 60 such as an electrical manipulation lever or the like outputting a manipulation signal to operate a working device such as a boom or the like; and a controller 70 outputting a control signal for locking the hydraulic device 50 or the electrical device 60 of the equipment when the function selection switch 20 is manipulated to be turned on.

Figure 2:
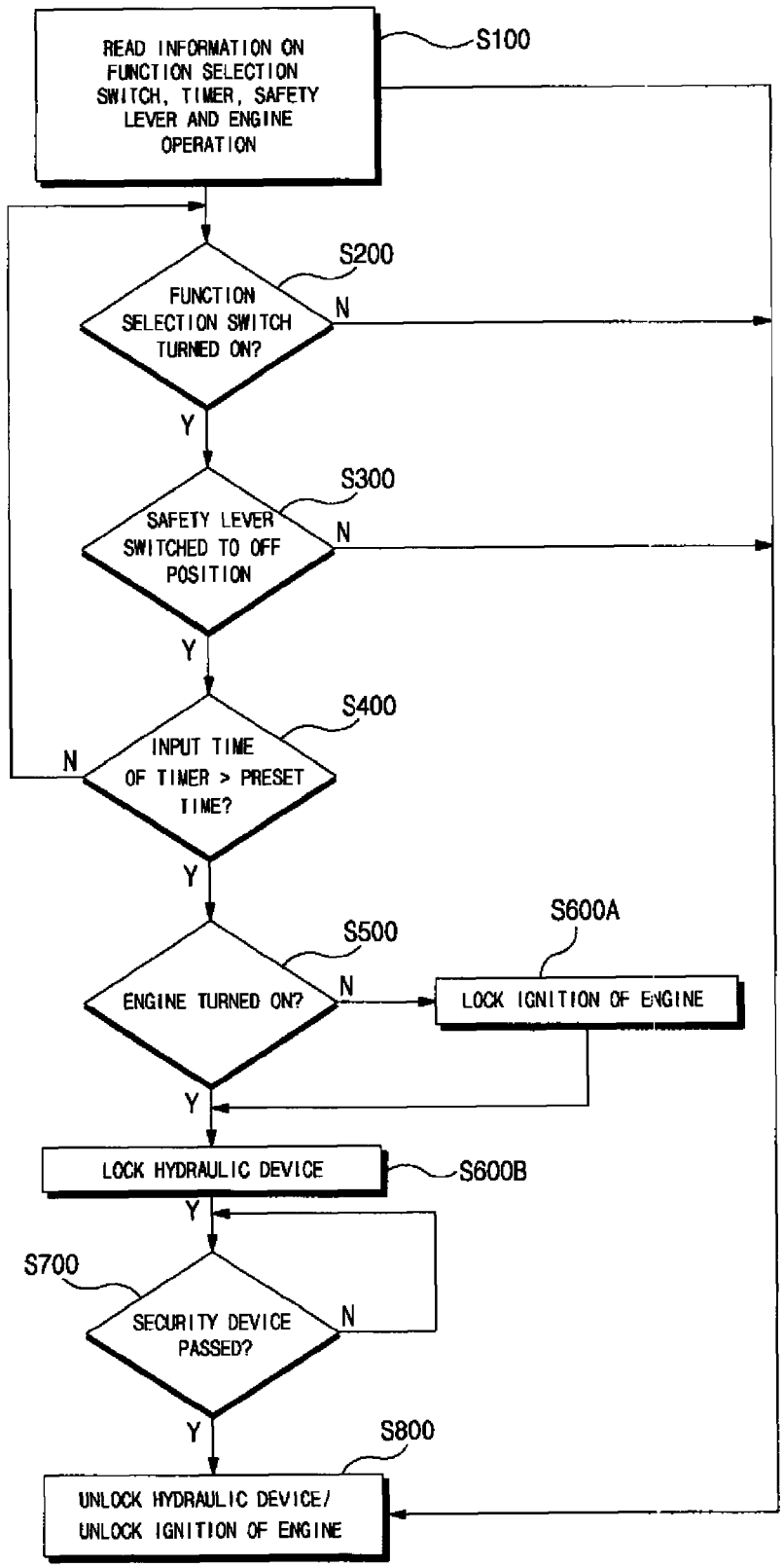
FIG. 2 is a flowchart illustrating an antitheft method for construction equipment according to an embodiment of the present disclosure.

As shown in FIGS. 1 and 2, the antitheft system and method for construction equipment includes a hydraulic device, such as a control valve, for controlling flow of working fluid supplied to an actuator, such as a hydraulic cylinder or the like which drives a working device such as a boom or an arm.

In step S100, the controller reads information on operations of the function selection switch 20, the timer 30, the safety lever 40, and the engine 10.

In step S200, it is determined whether the function selection switch 20 (having a function of automatically locking a hydraulic device so as to prevent the construction equipment from operating in the case where a driver gets out of a cabin in the state in which an ignition is turned on or in a case where a driving unit is not manipulated during a predetermined period) is turned on or off. If the function selection switch 20 is turned on, it proceeds to next step S300, and if the function selection switch 20 is turned off, it proceeds to step S800.

In step S300, it is determined whether the safety lever 40 is switched to an ON or OFF position. If the safety lever 40 is switched to the OFF position, it proceeds to step S400, and if the safety lever 40 is switched to the ON position, it proceeds to step S800.

The OFF state of the safety lever 40 means that when any control lever is manipulated by a part of a human body of a driver, the function of the manipulated control lever is not activated. The ON state of the safety lever 40 means that when the driver manipulates any control lever, the function of the manipulated control lever is activated.

That is, in a case where the driver leaves a driver's seat, the driver switches the safety lever 40 towards a floor of the cabin (i.e., OFF position) before the driver leaves the driver's seat.

In step S400, an input time (e.g., 30 minutes) inputted to a timer 30 and a preset time (e.g., 10 minutes) are compared with each other. If the input time of the timer 30 is shorter than the preset time, it proceeds to step S200. If the input time of the timer 30 is longer than the preset time, it proceeds to step S500.

In step S500, in the case where the function selection switch 20 is switched to the ON state by the driver, the safety lever 40 is switched to the OFF position by the driver, and the input time of the timer 30 is longer than the preset time, it is determined whether ignition of the engine 10 is turned on or off. If the engine 10 is turned on, it proceeds to step S600B, while if the engine 10 is turned off, it proceeds to step S600A.

In step S600B, the hydraulic device is locked so that the driving unit of the construction equipment is not operated. If it is determined whether ignition of the engine is turned on (step S500) under the conditions that the function selection switch 20 is switched to the ON state by the driver (step S200), the safety lever 40 is switched to the OFF position by the driver (step S300), and the timer input time is longer than the preset time (step S400), it is determined that the driver gets out of the cabin in the state in which the ignition is turned on, and thus the hydraulic device is locked so as not to drive the driving unit of the equipment.

In step S600A, if it is determined that the ignition of the engine is turned off (step S500) under the conditions that the function selection switch 20 is switched to the ON state by the driver (step S200), the safety lever 40 is switched to the OFF position by the driver (step S300), and the input time of the timer 30 is longer than the preset time (step S400), the hydraulic device is locked so as not to turn the engine ON.

As described above, in the case where the driver leaves the driver's seat in the state in which the ignition is turned on, the hydraulic device or an electric device is automatically locked. As a result, the construction equipment is not driven without inputting a password or manipulating the function selection switch to release the function of the function selection switch (i.e., switched to the OFF state), thereby preventing a theft case.

In step S700, in the case where the driving unit of the construction equipment is switched to a LOCK state, it is determined whether it passes a security device (e.g., password). If the security device is passed, it proceeds to step S800. If the security device is not passed, it waits until the security device is passed.

In step S800, if the security device is passed, the driving unit of the construction equipment is unlocked (the hydraulic device is unlocked).

As a result, the driver manipulates any control lever to operate the working device of the construction equipment or drive the construction equipment.

With the antitheft system and method for construction equipment according to the present disclosure, in the case where the driver gets out of the cabin in the state in which the ignition is turned on so as to preheat a heater or engine or in a case where a driving unit is not manipulated during a predetermined period, it is determined that the driver gets out of the cabin, and then the hydraulic device is automatically locked.

Therefore, if the function selection switch is unlocked (the function selection switch is switched to the LOCK state) in the state the ignition is turned on, it is possible to drive the construction equipment, thereby preventing the theft thereof.

Although preferred embodiments of the present disclosure have been described for illustrative purposes, those skilled in the art will appreciate that various modifications, additions and substitutions are possible, without departing from the scope and spirit of the present disclosure as disclosed in the accompanying claims.

The invention claimed is:

1. An antitheft method for construction equipment including a hydraulic device for controlling flow of working fluid supplied to an actuator which drives a working device, the antitheft method comprising:
   a first step of reading information on a function selection switch, a timer, a safety lever and engine operation;
   a second step of determining whether the function selection switch is turned on or off;
   a third step of determining whether the safety lever is switched to an OFF position;
   a fourth step of comparing an input time inputted in a timer with a preset time and if the input time of the timer is shorter than the preset time, proceeding to the second step;
   a fifth step of determining whether an ignition of the engine is turned on if the function selection switch is switched to an ON state by a driver, the safety lever is switched to the OFF position by the driver, and input time of the timer is longer than a preset time;
   a sixth step of determining that the driver gets out of a cabin in the state in which the ignition of the engine is turned on, and locking a driving unit so that a driving unit does not operate if it is determined in the fifth step that the ignition is turned on;
   a seventh step of determining whether a security device is passed by the driver if the driving unit is switched to a lock position; and
   an eighth step of unlocking the driving unit if a user has passed the security device.

2. The antitheft method according to claim 1, wherein if it is determined in the fifth step that the ignition is turned on, the sixth step locks the hydraulic device, while if is determined in the fifth step that the ignition is turned off, the sixth step locks the driving unit to prevent the ignition from being turned on.

* * * * *